United States Patent
Samadani et al.

(10) Patent No.: US 8,947,563 B2
(45) Date of Patent: Feb. 3, 2015

(54) REDUCING CROSSTALK

(71) Applicant: Hewlett-Packard Development Company, L.P., Houston, TX (US)

(72) Inventors: Ramin Samadani, Palo Alto, CA (US); Dookun Park, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 13/834,472

(22) Filed: Mar. 15, 2013

(65) Prior Publication Data
US 2014/0267835 A1 Sep. 18, 2014

(51) Int. Cl.
*H04N 5/217* (2011.01)
*H04N 7/15* (2006.01)

(52) U.S. Cl.
CPC .................................. *H04N 5/217* (2013.01)
USPC ....................................... 348/241; 348/14.12

(58) Field of Classification Search
CPC ......... H04N 5/21; H04N 5/217; H04N 17/00; H04N 7/144; H04N 7/15; H04N 7/147
USPC ........ 348/241, 253, 256, 14.01, 14.08, 14.09, 348/14.1, 14.07, 14.12, 211.1, 211.4, 744, 348/745, 609; 345/592, 76; 353/84, 30, 122
See application file for complete search history.

(56) References Cited

U.S. PATENT DOCUMENTS

| | | | |
|---|---|---|---|
| 7,690,795 B2 * | 4/2010 | Cole et al. | 353/30 |
| 7,705,886 B2 | 4/2010 | Harada et al. | |
| 8,253,821 B2 | 8/2012 | Jung et al. | |

(Continued)

FOREIGN PATENT DOCUMENTS

GB    2481664    1/2012

OTHER PUBLICATIONS

Dookun Park et al, Temporal Modulation for Computational Video Cross-Talk Reduction, Stanford University, Hewlett-Packard Labs, ICIP 2012, 4 Pages.

(Continued)

*Primary Examiner* — Aung S Moe
(74) *Attorney, Agent, or Firm* — Hewlett-Packard Patent Department; Ivan Kirchev

(57) ABSTRACT

A method for reducing video crosstalk in a display-camera system includes capturing a first image of a local site while projecting an image of a remote site with a first intensity gain; capturing a second image of the local site while projecting the image with a second gain that is different from the first gain; capturing a first mixed image of the local site that includes the first image combined with the projected image having first gain and a second mixed image of the local site that includes the second image combined with the projected image having second gain; performing crosstalk reduction on the mixed images to create a reconstructed image of the local site, wherein performing crosstalk reduction of the mixed images includes determining whether a pixel value variation between the mixed images is affected by motion in the first and the second image of the local site.

20 Claims, 7 Drawing Sheets

(56) References Cited

U.S. PATENT DOCUMENTS

| | | | |
|---|---|---|---|
| 8,339,333 B2 | 12/2012 | Casner et al. | |
| 8,866,880 B2 * | 10/2014 | Tan et al. | 348/42 |
| 2011/0032230 A1 | 2/2011 | Sun et al. | |
| 2012/0062449 A1 * | 3/2012 | Apostolopoulos et al. | 345/76 |
| 2012/0062690 A1 * | 3/2012 | Apostolopoulos et al. | 348/14.12 |
| 2012/0062799 A1 * | 3/2012 | Apostolopoulos et al. | 348/609 |
| 2012/0274732 A1 * | 11/2012 | Tan et al. | 348/14.08 |
| 2014/0085401 A1 * | 3/2014 | Tan et al. | 348/14.07 |
| 2014/0092121 A1 * | 4/2014 | Robinson | 345/592 |
| 2014/0104368 A1 * | 4/2014 | Tan | 348/14.07 |

OTHER PUBLICATIONS

Doutre, C. et al., Optimized Contrast Reduction for Crosstalk Cancellation in 3D Displays, (Research Paper), 3DTV Conference: The True Vision—Capture, Transmission and display of 3D Video, May 16-18, 2011, 4 Pages.

* cited by examiner

REDUCING CROSSTALK

BACKGROUND

With the increased availability and the improved cost of high-speed network connectivity, video conferencing conducted over networks between participants in different locations has become very popular. Remote collaboration and videoconferencing systems enable remotely located users at two or more different sites to simultaneously collaborate with one another via two-way video and audio transmissions. A user at one location can see and interact with a user at other locations in real-time and without noticeable delay. Some of these systems may provide gaze and gesture awareness by placing a camera behind a see-through display. At times during interactive collaborations, the systems may display content on the screens of the local and/or remote users.

DETAILED DESCRIPTION

Figure 1:
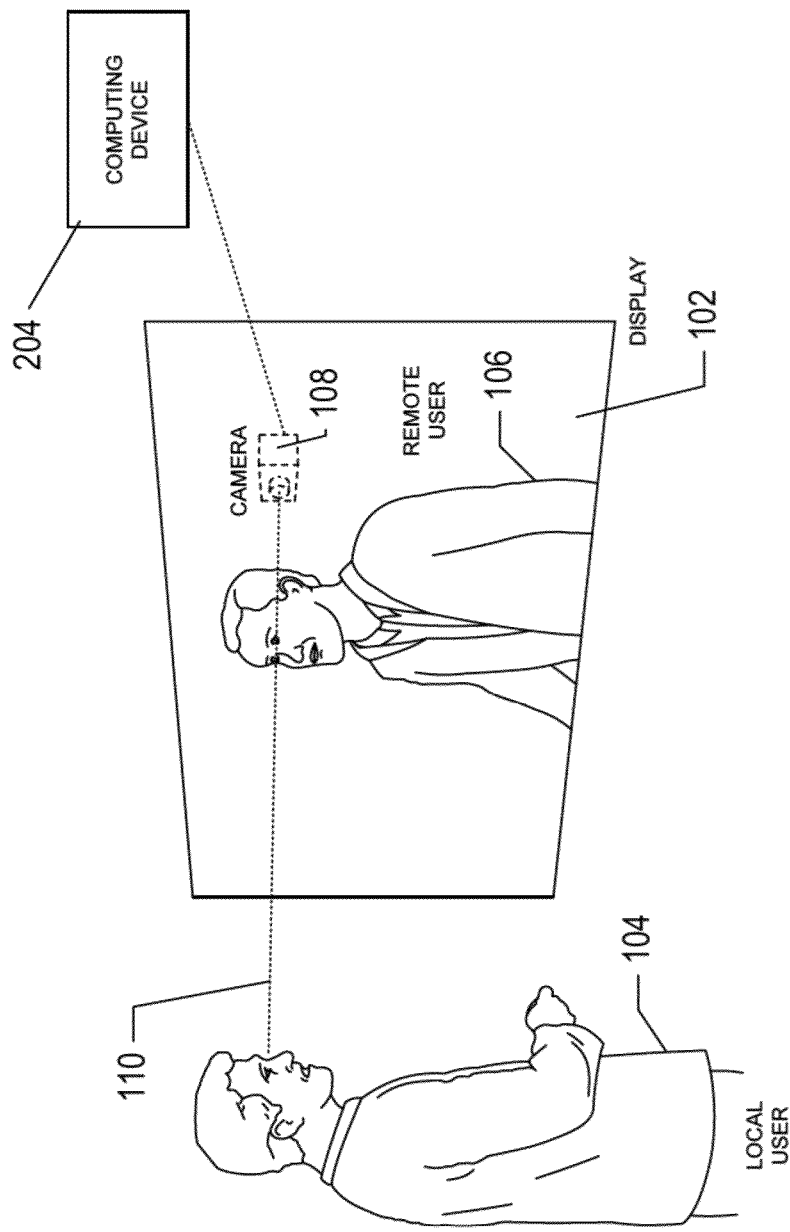
FIG. 1 is an example of a of two users video-conferencing through a display.

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

As used herein, the term display-camera system refers to interactive collaboration and videoconferencing systems that shares digital audio or visual media between remote users. The terms local site and remote site are descriptive terms that define a physical separation between the described systems, persons, or objects and other systems, persons, or objects. The physical separation may be any suitable distance between locations such as a short distance within the same room or between adjacent rooms of a building or a long distance between different countries or continents. The term local user refers to a person who views a local display-camera system, and the term remote user refers to a person who views a remote display-camera system.

As described herein, a display-camera system is configured to display remote content and to capture local content at the same time. For example, the display-camera system receives remote content from a remote system (e.g., a remote display-camera system located in a remote site) that may include captured images of the remote site or a remote user and displays the remote content to a local user using a projector or a display. The display-camera system also captures local content of the local site and local users through the display using a camera and transmits the local content to the remote system. This communication between the display-camera system and the remote system allows local and remote users to interact collaboratively with natural interactions that include eye contact along with gaze and gesture awareness.

Because the described display-camera system often displays remote content and captures local content simultaneously using the same display, the display-camera system is frequently afflicted by video crosstalk where the remote content displayed for viewing by the local user is unintentionally captured by the camera while capturing the local content and is delivered to the remote user. Therefore, the remote content displayed on the display and captured by the camera needs to be separated from the local content sent to the remote user.

This description is directed to methods and systems that reduce the video crosstalk in video streams transmitted between local users and remote users, where the proposed methods and systems also generate a brighter local signal with less flicker and allow more images to be captured by the camera. The proposed methods involve temporally modulating the intensity of the projected signal (i.e. images). The resulting mixed crosstalk signals (i.e., images captured by the camera combined with the projected images) are subsequently processed using a computational imaging analysis. The proposed analysis determines whether pixel value variation between the mixed crosstalk images is affected by motion in the captured local signal signals. This allows reconstruction of a crosstalk reduced signal with less flicker and greater brightness.

FIG. 1 shows an example of two video-conferencing participants interacting through a display 102. The display 102 enables a local user 104 to interact with a remotely located user 106. In the illustrated example, a camera 108 is positioned behind the display 102 at approximately eye level to the local user 104, to capture images of the local user 104 through the display 102. The camera 108 can be positioned so that its viewpoint is roughly equivalent to that of the remote user 106. In order to capture gestures made by the local user 104, the camera 108 can also be positioned so that the camera's field of view encompasses approximately the entire display 102. The camera is connected to a computing device 204 that performs crosstalk reduction according to the proposed method.

Figure 2:
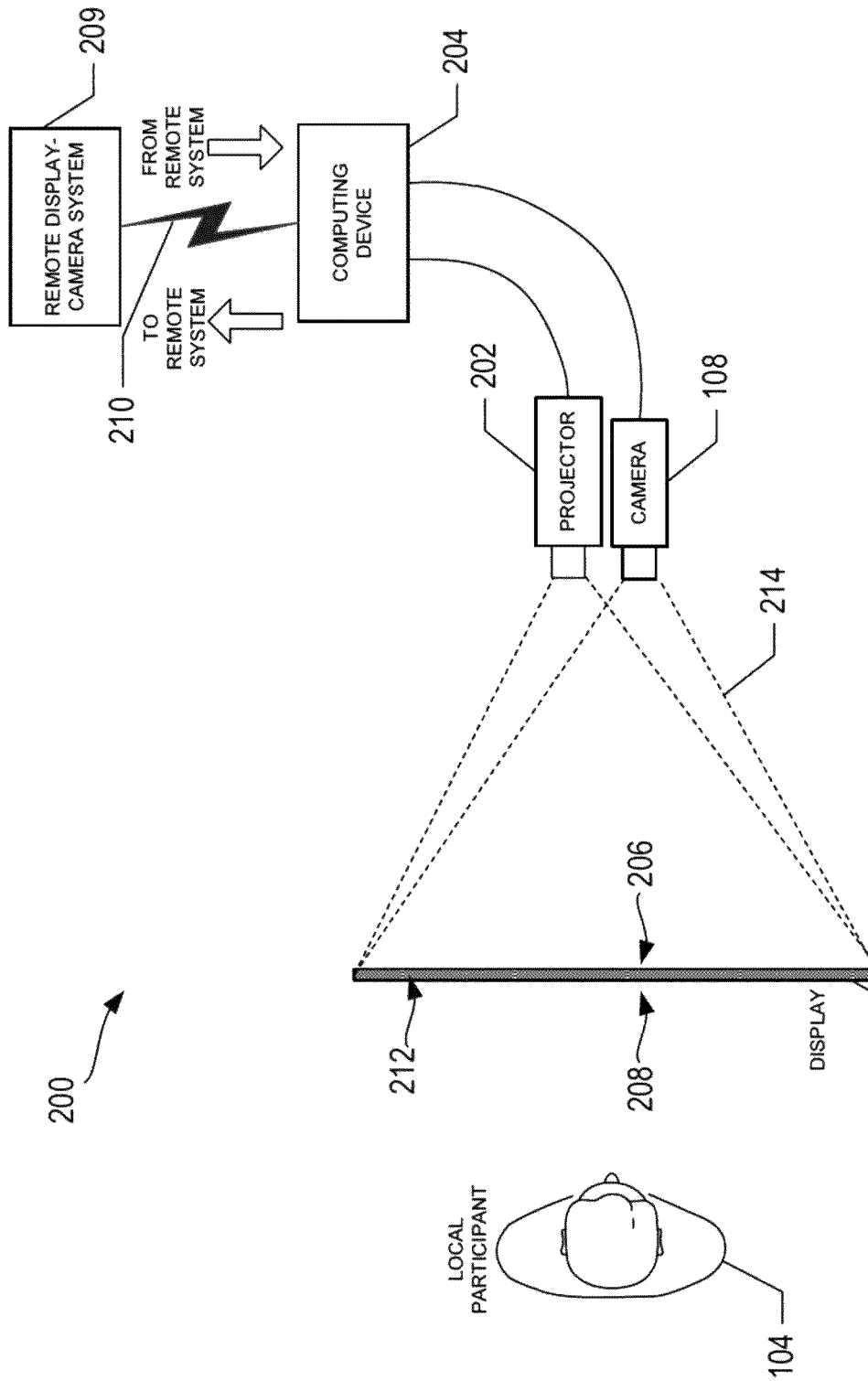
FIG. 2 is a schematic diagram illustrating an example of a display-camera system for reducing video crosstalk.

FIG. 2 is a schematic illustration of an example display-camera system 200. The system 200 includes the display 102, the camera 108, a projector 202, and the computing device 204. The camera 108 and projector 202 are connected to the computing device 204, and the camera 108 and projector 202 are positioned to face the rear surface 206 of the display 102. The computing device 204 is in communication with a remote display-camera system 209 via a communication link 210.

The display-camera system 200 receives remote content (not shown) from the remote display-camera system 209 using the link 210 where the remote content may include captured images of a remote cite including a remote user (not shown). The display-camera system 200 forms display content (not shown) from the remote content and added content (not shown), if any, from the local and/or remote users and provides the display content to the display 102. The display-camera system 200 projects the display content on the display 102 using the projector 108 to produce displayed content 212 that is viewable by the local user 104 of display-camera system 200. The display-camera system also captures local content (not shown) of the local site including the local user 104 through the display 102 using the camera 108 and transmits the local content to remote system 209 using the link 210.

The projector 202 receives display content from the computing device 204 and projects the content to the display 102. In particular, the projector 202 receives display content as a sequence of display images and successively projects the images in non-overlapping time periods. The projector 202 is positioned to project images onto the rear surface 206 within this range of angles so that when the local user 102 views the front surface 208 of the display 102 the local user 104 sees the projected images. In some embodiments (not shown), the projector 202 may be positioned in front of the display 102 (e.g., next to or behind the local user 104) so the projector 202 may project images onto the front surface 208 of the display 102.

The display 102 displays the content to the local user 104. The display 102 may be composed of a relatively low concentration of light diffusing particles that diffuse light striking the rear surface 206 within a range of angles. The display 102 is at least partially transparent to allow the camera 108 to capture local content, including images of the local user 104, through display 102. Alternatively, the display 102 may be fully transparent. In some embodiment, the display 102 may be a screen, a projector, a transparent liquid crystal display (LCD), an organic light emitting diode (OLED) display, or any suitable display. In the example where the display 102 is a projector, the projector 202 is eliminated from the system 200 and the display 102 performs all functions generally performed by the projector. Also, the display 102 may be sufficiently large so as to display life-size images of the remote users of remote system 209.

The camera 108 captures local content in response to control signals from the computing device 204. In particular, the camera 108 captures local content as a sequence of local images that are captured in non-overlapping time periods. The camera 108 provides local images to computing device 204 that performs crosstalk reduction and transmits the reconstructed images to the remote system 209.

In the illustrated example, the camera 108 is positioned behind the display 102 with a distance that is selected so that field of view 214 of the camera encompasses all or substantially all of the front side of display 102. The camera may also be positioned relative to the display 102 so that field of view 214 is aligned with all or a selected portion of the front side of display 102 to allow for a non-arbitrary mapping between camera 108 and display 102. The camera 108 may further be positioned relative to display 102 to capture images with a sense of eye content and gaze awareness of the local user 104.

The camera 108 may represent any suitable type and number of cameras that capture images through display 102. The camera 108 may include any suitable image sensor, such as a digital charge couple device (CCD) or complementary metal-oxide-semiconductor (CMOS) active pixel sensor.

The communication link 210 includes any suitable type, number, and/or configuration of network and/or port devices or connections configured to allow display-camera system 200 to communicate with the remote system 209 and/or other remote systems (not shown). The devices and connections of link 210 may operate according to any suitable networking and/or port protocols to allow information to be transmitted by display-camera system 200 to a network, remote system 209 and/or other remote systems (not shown) or received by display-camera system 200 from a network, remote system 209, and/or other remote systems (not shown). For example, connections between the devices shown in FIG. 2 can be made through local area networks ("LANs"), wide area networks ("WANs"), public switched telephone networks ("PSTNs"), wireless networks, Intranets, the Internet, or any other suitable networks.

The remote system 209 represents any suitable display-camera system, display system, and/or processing system located remotely from display-camera system 20. The remote system 209 captures and/or provides remote content to display-camera system 200 and receives local content from display-camera system 200.

The computing device 204 provides control signals that control the operation of the display 102, the camera 108, the projector 202, and the link 210. The computing device 204 receives remote content from the remote system 209 using the link 210. The computing device 204 generates images to be displayed and provides these images to the projector 202 to project them to the display 102. Further, the computing device 204 controls the operation of camera 108 to cause local images to be captured and transmitted to remote system 209 using link 210. As described in additional detail below, the computing device 204 implements various methods for reducing the video crosstalk in the captured images.

Figure 3:
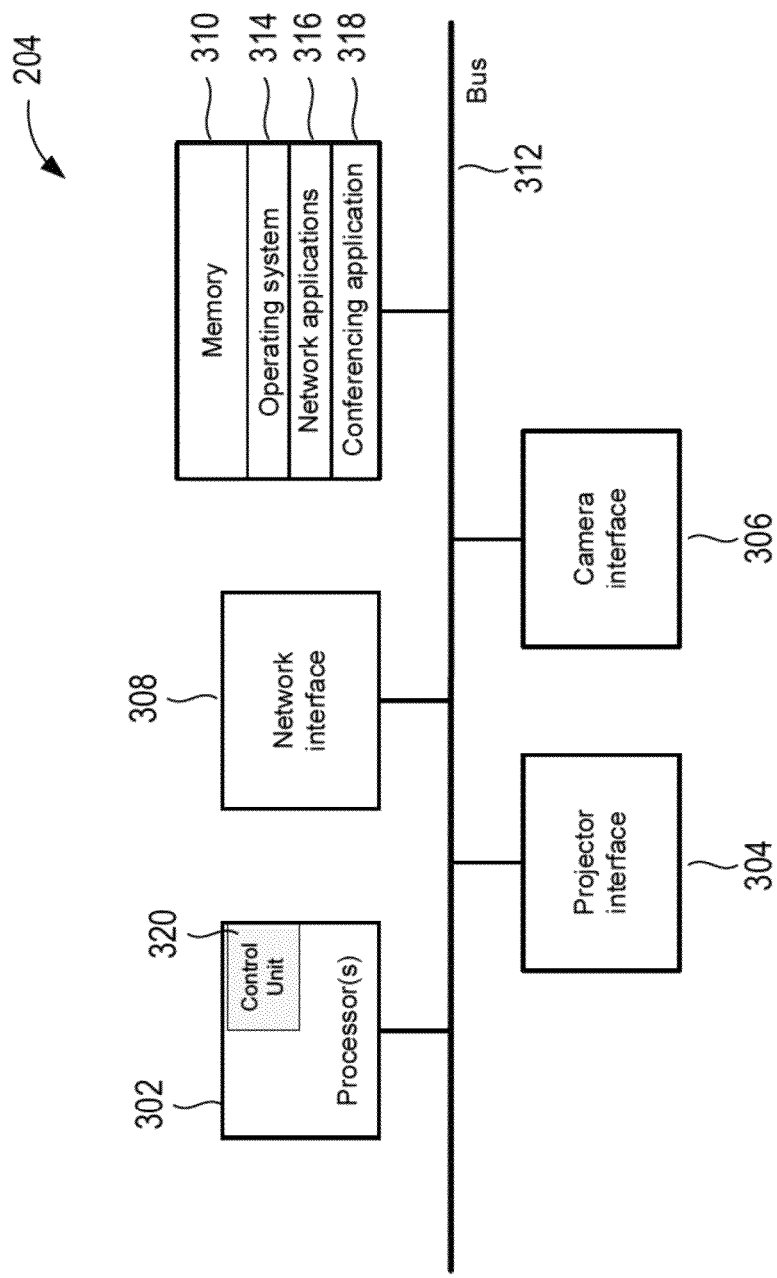
FIG. 3 is a schematic diagram illustrating an example of a computing device of the display-camera system of FIG. 2.

The computing device 204 can be a server, a desktop computer, a laptop, or any other suitable device configured to carry out video and image processing. In certain embodiments, the computing device 204 can be integrated in the projector 202 or the camera 108. FIG. 3 shows a schematic representation of the computing device 204. The device 204 may include a processor 302 (e.g., a central processing unit, a microprocessor, a microcontroller, or another suitable programmable device); a projector interface 304; a video or camera interface 306; a network interfaces 308, such as a Local Area Network LAN, a wireless 802.11x LAN, a 3G mobile WAN or a WiMax WAN; and a memory 310. Each of these components is operatively coupled to a bus 312. For example, the bus 312 can be an EISA, a PCI, a USB, a FireWire, a NuBus, or a PDS. In other embodiments, the computer 204 includes additional, fewer, or different components for carrying out similar functionality described herein.

The processor 302 includes a control unit 320 that may be implemented using any suitable type of processing system (not shown) with a more processor configured to execute computer-readable instructions stored in the memory 310. The memory 310 includes any suitable type, number, and configuration of volatile or non-transitory machine-readable storage media configured to store instructions and data. Examples of machine-readable storage media in the memory 310 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, hard disk, an SD card, and other suitable magnetic, optical, physical, or electronic memory devices.

The computer memory 310 may also store an operating system 314, such as Mac OS, MS Windows, Unix, or Linux; network applications 316; and a video-conferencing application 318. The operating system 314 can be multi-user, multi-processing, multitasking, multithreading, and real-time. The operating system 314 can also perform basic tasks such as recognizing input from input devices, such as a keyboard, a keypad, or a mouse; sending output to a projector and a camera; keeping track of files and directories on medium 310; controlling peripheral devices, such as disk drives, printers, image capture device; and managing traffic on the bus 312. The network applications 316 includes various components for establishing and maintaining network connections, such as computer-readable instructions for implementing communication protocols including TCP/IP, HTTP, Ethernet, USB, and FireWire.

The video-conference application 318 provides various computer-readable instruction components for sharing content between video conference participants, as described above. In certain embodiments, some or all of the processes performed by the application 318 can be integrated into the operating system 314. The processes can be at least partially implemented in digital electronic circuitry, or in computer hardware, or in any combination thereof.

The machine-readable storage media are considered to be an article of manufacture or part of an article of manufacture. An article of manufacture refers to a manufactured component. Software stored on the machine-readable storage media and executed by the processor 302 includes, for example, firmware, applications, program data, filters, rules, program modules, and other executable instructions. The control unit 320 is configured to retrieve from the machine-readable storage media and execute, among other things, instructions related to the control processes and methods described herein.

When executed, the instructions cause the control unit 320 to generate and provide display content and control signals to the projector 202 and the display 102. The instructions also cause control unit to 320 to generate and provide control signals to the camera 108. The instructions also cause the control unit to 320 to generate and provide control signals to the link 210 to cause remote content to be received from remote system 209 and/or other remote systems (not shown) and cause local content to be provided to remote system 209.

The following paragraphs describe methods for reducing crosstalk in images captured by the camera 108 of the video-conferencing system 200. The camera 108 and projector 202 are timed so that images of with local content from the local site are captured through the display 102 at approximately the same time images with remote content from the remote site are projected onto the display 102. The camera 108 captures a series of images that form a video stream or signal with local content sent to the computing device 204 for video processing. Without video crosstalk reduction, each image captured by the camera 108 appears as a blending of the image of the local site captured through the display 102 with the image of the remote site projected onto the display 102.

Figure 4:
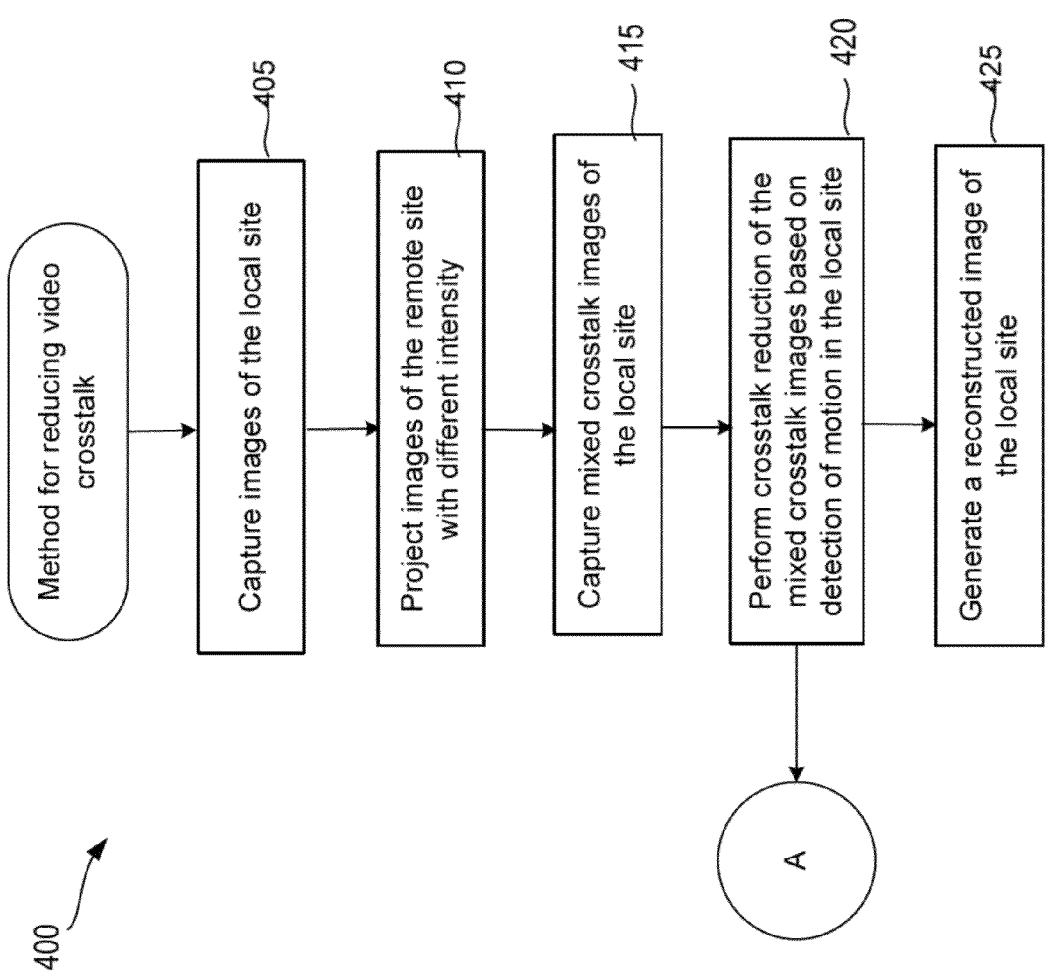
FIG. 4 is a flow chart illustrating an example of a method for reducing video crosstalk.
Figure 5:
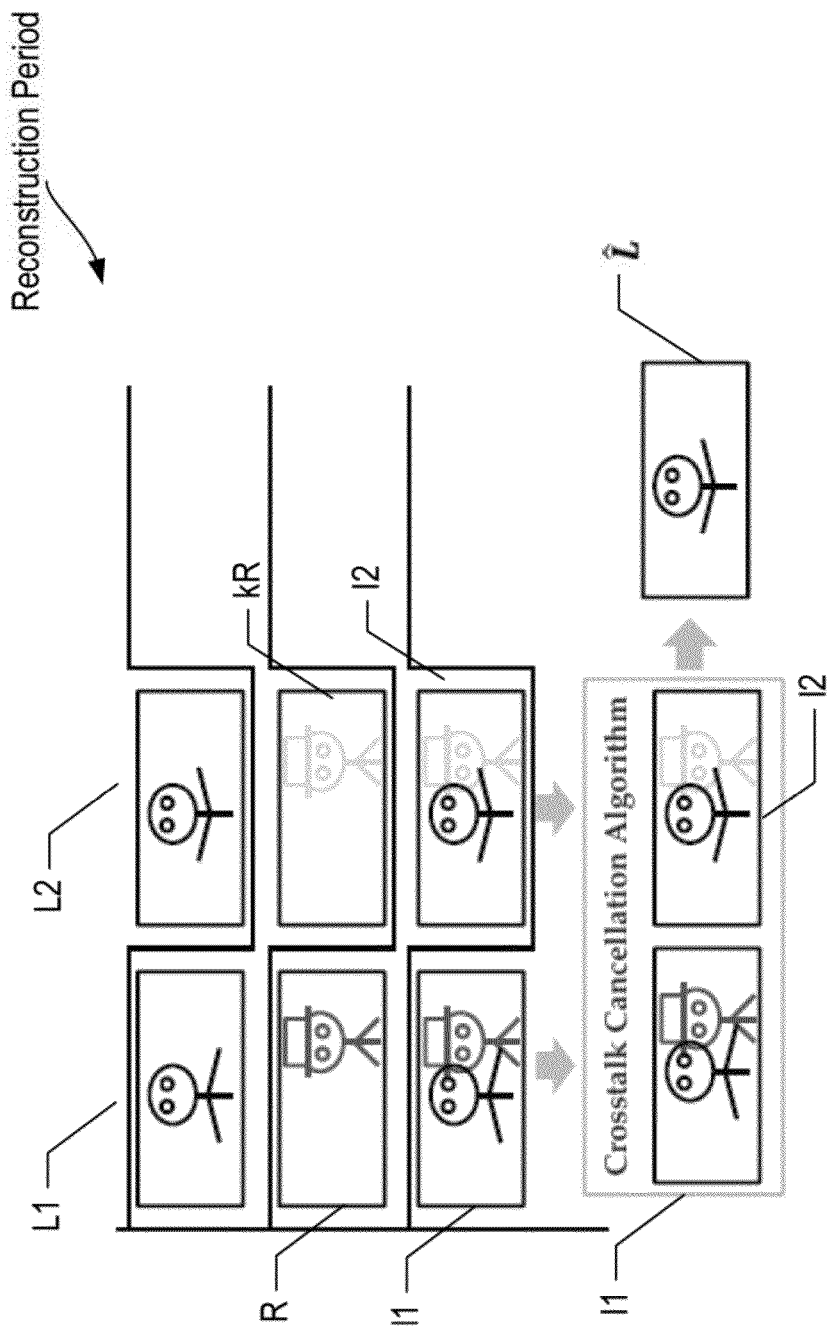
FIG. 5 is a schematic illustration showing an example of the method for reducing video crosstalk.

FIGS. 4 and 5 respectively illustrate a flow chart showing an example of a method 400 for reducing video crosstalk and a schematic illustration of the same. The method 400 can be executed by the control unit 320 of the processor 302. Various steps described herein with respect to the method 400 are capable of being executed simultaneously, in parallel, or in an order that differs from the illustrated serial manner of execution. The method 400 is also capable of being executed using additional or fewer steps than are shown in the illustrated example.

In step 405, the control unit 320 sends control signals to the camera 108 to capture a plurality of images of the local site, including the local user 104. For each reconstruction period (i.e., a period during which the system generates a reconstructed image of the local site for the remote system 209), the camera 108 captures at least two consecutive images of the local site. As shown in FIG. 5, the camera 108 may capture a first image L1 and a second successive image L2. The images L1 and L2 may differ due to motion of the local user 104 or noise. In some embodiments, the control unit 320 may use more than two images of the local site to perform the crosstalk reduction process. As explained above, the camera 108 may capture the images of the local site through the display 102.

Next, at step 410, the control unit 320 sends control signals to the projector 202 to project a plurality of images of the remote site on the display 102. As shown in FIG. 5, for each reconstruction period, the projector 202 projects at least one image, where the image is projected at least two successive times in the form of images R and kR. As noted above, when the system does not include a projector, the images are projected by the display 102. In some embodiments, the control unit 320 may use more than two images of the remote site to perform the crosstalk reduction process. Each successive image R and kR is projected with a different intensity gain modulated by the control unit 320. The intensity gain represents the intensity value of each projected image. In one embodiment, the intensity gain can be controlled or modulated by the control unit 320. For example, the intensity gain of a projected image can be manually modulated by a user via a user interface (not shown). Alternatively, the computing device 204 can be configured to automatically change the intensity gain of a projected image.

Each successive image R and kR is projected at approximately the same time as each image L1 and L2 of the local site is captured. In one example, the intensity gain of the successive images R and kR is 1 and k, where 0<k<1. In some embodiments 1 is a full intensity (i.e., 100%) of the projected image R and the image kR has an adjusted or modulated intensity based on the dimming factor k (also called a modulation value). In other embodiments, the first image R can have different intensity (e.g., not a 100%) but the intensity of R is always greater than the intensity of kR. Repeating the projected image of the remote user with different intensity gains removes the motion from the remote signal (as illustrated by the faded image in kR) that allows for a simpler and more effective reconstruction of the local image.

In step 415, the camera 108 captures a plurality crosstalk or mixed images if the local site. As shown in FIG. 5, the camera captures at least two mixed images I1 and I2 of the local site. The mixed images I1 and I2 include a captured image of the local site combined with a projected image of the remote cite.

$$I1(m,n)=L1(m,n)+R(m,n)$$

$$I2(m,n)=L2(m,n)+kR(m,n) \quad (1)$$

As shown in equation (1), the first mixed image I1 of the local site includes the first image of the local site L1 blended with the first projected image R having a first intensity gain. The second mixed image I2 of the local site includes the second image of the local site L2 combined with the repeated projected first image kR having second intensity gain. In some examples, the control unit 320 may use more than two mixed crosstalk images of the local site to perform the crosstalk reduction process.

Each single mixed image I (e.g., I1, I2 . . . , In) of the local site captured by the camera 108 includes an array of pixels (not shown). All pixels in the array are arranged in a configuration where each pixel has an (m, n) coordinate and an associated intensity. In particular, (m, n) represent the row and column location of each pixel in the array. The combinations of the intensities of all pixels in the array result in the intensity gain of the projected image. Each pixel in the array can be a single color pixel, such as red, green, or blue, of a full color image. For example, in the first mixed image I1, the projector 202 projects the image onto the display with approximately 100% intensity gain. For each pixel of the mixed image I1, the intensity of that pixel is the sum of an intensity associated with a scene captured by the camera 108 and an intensity associated with an image projected by the projector onto the display 102. Thus, each pixel in the image I1 is corrupted by video crosstalk. In the second mixed image I1, the projector 202 projects the image onto the display with modulated intensity gain. Thus, a pixel value variation between the mixed images I1, I2, . . . In, etc. is the difference in the pixel intensity values between pixels in these images that have the same coordinates (m, n).

In step 420, each mixed image of the video stream is sent from the camera 108 to the computing device 204 for crosstalk reduction of the mixed image. The specific methods for crosstalk reduction of the mixed images are described in more details below. In one embodiment, performing crosstalk reduction of the mixed images includes determining whether a pixel value variation between the mixed images is affected by motion in the first and the second image of the local site. As noted above, the pixel value variations between the mixed images are represented by changes in the pixel intensity between each image. Next, in step 425, the control unit creates a reconstructed image ^L of the local site and sends it to the remote system 209. Therefore, each image in the video stream sent from the computing device 204 to the remote system 209 is with reduced crosstalk and includes the scene captured through the display 102 with the contribution of the image projected onto the display 102 significantly reduced.

Figure 6:
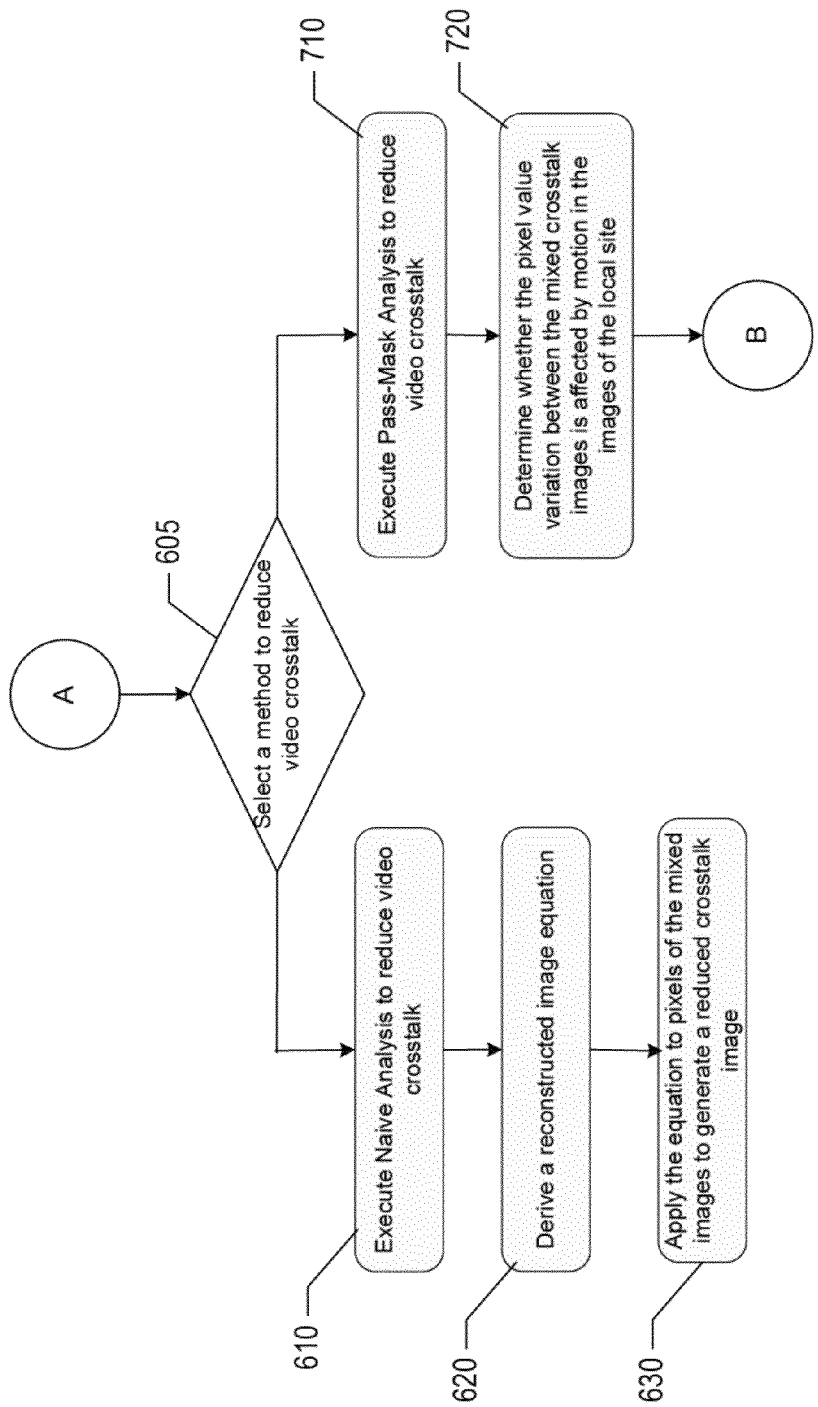
FIGS. 6 and 7 are flow charts illustrating an example of the method for reducing crosstalk based on detection of motion in a local site.
Figure 7:
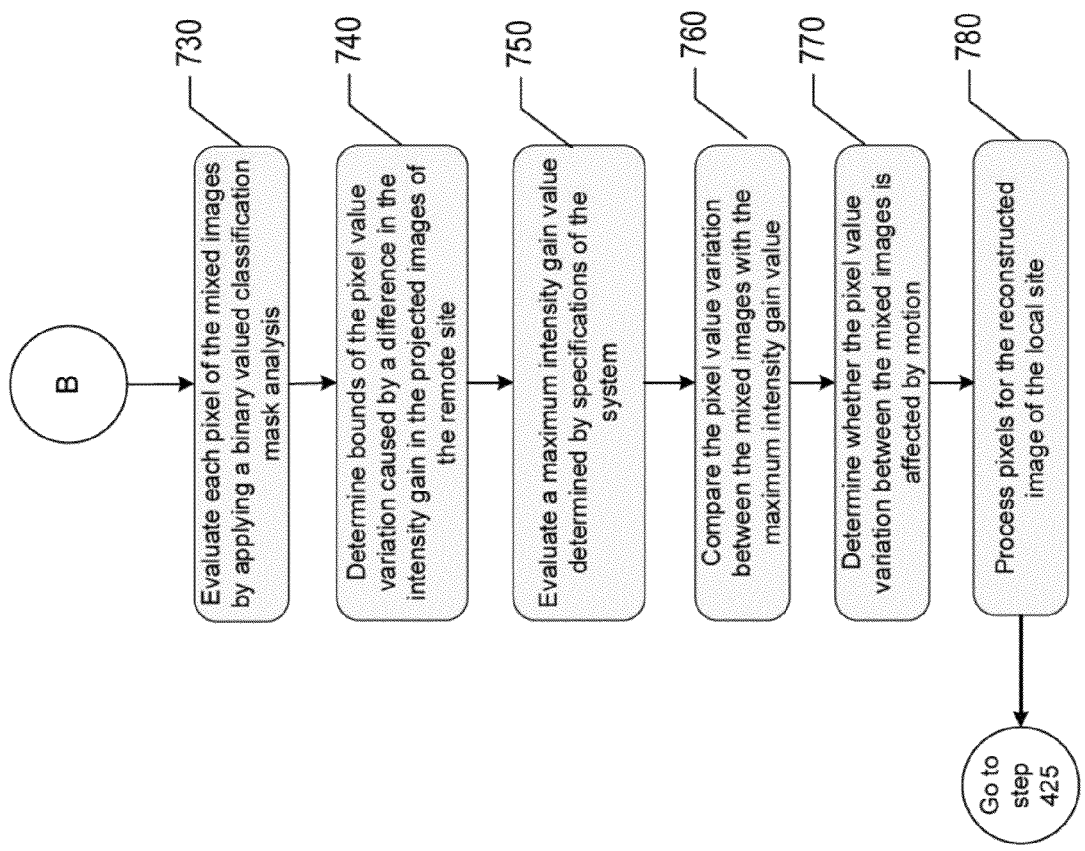

FIGS. 6 and 7 illustrate flow charts showing examples of methods for crosstalk reduction of the mixed images. The described methods can be executed by the control unit 320 of the processor 302. Various steps described herein with respect to the methods are capable of being executed simultaneously, in parallel, or in an order that differs from the illustrated serial manner of execution. The methods also capable of being executed using additional or fewer steps than are shown in the illustrated example.

In one embodiment, the control unit 320 can execute two different methods for reducing the crosstalk in the mixed images. In step 605 of FIG. 6, the control unit 320 determines which crosstalk reduction method to apply—a Naive analysis (step 610) or a Pass-Mask analysis (710). The selection may be manually entered by a user of the video-display system 200 (e.g., via a user interface (not shown) attached to the computing device 204). Alternatively, the computing device 204 can be configured to automatically bypass one of the methods (e.g., the Naive analysis) and to apply the other method (e.g., the Pass-Mask method).

When executing the Naive analysis method, the control unit 320 is not configured to detect motion in the captured local image (i.e., change between L1 and L2) when reconstructing the mixed images I2 and I2. The goal of this method is to create a reconstructed image ^L of the local site having less crosstalk. At step 620, a reconstructed image equation is derived $$\hat{L}2(m, n) = (k/1-k)[I2(m, n) - I1(m, n)] + I2(m, n) \quad (2)$$
$$= G\Delta I(m, n) + I2(m, n)$$

where $\hat{L}2$ represents the reconstructed image of the local site captured by the camera, $G=(k/1-k)$ is a constant gain factor representing the intensity gain that is used to modify the pixels in the mixed crosstalk image. $\Delta I$ is the pixel value variation (i.e., the difference in pixel intensity) between the pixels in the first mixed image and the second mixed image, and I2 represents the second mixed frame captured by the camera. In the illustrated example, $\Delta I(m, n)=I2(m, n)-I1(m, n)$. Equation (2) may be further simplified $$\hat{L}2(m, n) = G[\Delta L(m, n) - (1-k) \cdot R(m, n)] + I2(m, n) \quad (3)$$
$$= G\Delta L(m, n) + L2(m, n),$$

where $\Delta L(m, n)$ represents the difference between the consecutive captured local images $L2(m, n)-L1(m, n)$. If there is no local motion, $\Delta L(m, n)=0$ and the reconstructed image $\hat{L}2(m, n)$ is equal to the second successive image $L2(m, n)$ of the local site. At step 630, equation (2) is applied to each pair of pixels with the same location coordinates (m, n) in the images I1 and I2 to generate a reduced crosstalk image.

When there is motion in the captured local images, the reconstructed image $\hat{L}2(m, n)$ is a sum of the desired local image $L2(m, n)$ and the additional term $G\Delta L(m, n)$ that includes the constant G and difference between the consecutive captured local images. However, objectionable motion artifacts typically occur at the boundaries of moving objects. Therefore, $\Delta I$ (i.e., the pixel value variation between I1 and I2) is often due to motion induced pixel differences, amplified by the gain factor G. In some situations, higher sampling rates reduce $\Delta L$, and the motion artifacts may be reduced to an extent. However, there are still objectionable motion artifacts due to the amplification. Therefore, a different process is required to reduce the crosstalk and the motion artifacts from the mixed images.

The following paragraphs describe the pixel-adaptive Pass-Mask analysis for reducing video crosstalk. The two main sources for the pixel value variation between a plurality of mixed images (e.g., the mixed images I1 and I2) are: 1) motion in the captured local images; and 2) modulation of the remote projected images. The pixel value variation between the mixed images is represented by $$\Delta I(m,n)=\Delta L(m,n)-(1-k)R(m,n) \quad (4)$$

where $\Delta L(m, n)$ represents the difference in the pixel intensity values due to motion in the local images and $(1-k)R(m, n)$ represents the difference in the pixel intensity values due to the change of the intensity in the projected images. Generally, change of the intensity in the projected images is required to reduce the video crosstalk, but the undesired motion in the local images generates visual artifacts in the reconstructed image. Removing the motion in the local images from the pixel value variation $\Delta I(m, n)$ calculation is desired. However, the motion in the local images is difficult to detect and remove since there is no prior information about the local images and remote images that compose the mixed captured images.

Even though the proposed method cannot disambiguate the cause of the pixel value variation, the Pass-Mask analysis includes computing bounds beyond which the pixel value differences caused by modulation of the projected image alone cannot go beyond. Outside these bounds, where motion is certainly one of the effects, the analysis does not apply crosstalk reduction. Perceptually, the residual crosstalk that remains in fast moving areas is low level and much preferred to the amplified motion artifacts that result from the erroneous naive reconstruction.

The described Pass-Mask method for crosstalk reduction classifies the pixel value variation between the two or more consecutive crosstalk images and determines whether the pixel value variation is definitely affected by motion and possibly not affected by motion in the images of the local site (at step 720). The control unit 320 uses the described method to analyze the individual pixels in the mixed images and process the analyzed pixels adaptively in creating the reconstructed image of the local site.

The classification of the Pass-Mask method is based on the characteristics of $(1-k)R(m, n)$—the difference in the pixel intensity values due to the change of the intensity in the projected images. FIG. 7 further describes the method for determining whether the pixel value variation of the mixed images ($\Delta I$) is affected by motion in the first and the second images L1 and L2 of the local site. In particular, the control unit 320 evaluates each pixel of the mixed images by applying a binary valued classification mask analysis (at step 730). Applying the binary valued classification mask analysis includes determining bounds of the pixel value variation caused by the change in the intensity gain in the projected images of the remote site (at step 740). In some embodiments, the control unit 320 can analyze more than one projected image. In the illustrated example, the control unit 320 determines the bounds of the pixel value variation based on the changed in the intensity gain of the successively projected image (R and kR).

Determining bounds of the pixel value variation caused by the change of the intensity gain of an image of the remote site includes evaluating a maximum intensity gain value determined by specifications of the system 200 (at step 750). In one example, the specifications of the system 200 include the specifications (i.e., parameters, functions, etc.) of the camera 108, the projector 202, and the display 102. When the system does not include a projector, only the specifications of the camera and the display are used. Referring to equation (4) above, for the modulated $R(m, n)$ pixel values, $R(m, n) \geq 0$. The modulation value k is $0 < k < 1$. A maximum intensity gain value Rmax captured by the camera depends on the specific setup of the system 200.

In one embodiment, the maximum intensity gain value Rmax is empirically determined by displaying a constant white image on the projector 202 and capturing the reflected crosstalk with the camera 108 in a dark room. Camera parameters like exposure time, aperture and gain are fixed during the Rmax measurement and during the operation of the system 200. Since the crosstalk is caused by the projector 202, Rmax is dependent on the system configuration, and not on external conditions like room light, background, etc. Based on this analysis, the difference in the pixel intensity values due to the change of the intensity in the projected images $(-(1-k)R(m, n))$ is bounded by the maximum intensity gain value $$-(1-k)R\text{max} \leq -(1-k)R(m,n) \leq 0 \quad (5)$$

If there is no motion in the images of the local site (i.e. $\Delta L(m, n) = 0$), then the pixel value variation between the mixed images $\Delta I(m, n)$ always falls within the bounds or limits of equation (5). The difference in the pixel intensity values due to motion in the local site ($\Delta L(m, n)$) in equation (4) is not used for the classification, since with the motion its bound is difficult to determine, because it is set by the colors of objects and backgrounds, illumination, amount of motion, etc.

In the next step 760, the control unit 320 compares the pixel value variation between the mixed images ($\Delta I$) with the maximum intensity gain value. A binary valued classification mask image P is defined by If $-(1-k)R\text{max} \leq \Delta I(m,n) \leq 0$ Then $P(m,n)=1$ Else Then $P(m,n)=0 \quad (6)$ Based on the determined mask P, the Pass-Mask analysis provides an estimate and determines whether the pixel value variation between the mixed images is affected by motion (at step 770), $$\hat{L}2(m,n) = GP(m,n)\Delta I(m,n) + I2(m,n) \quad (7)$$

When the pixel value variation $\Delta I$ is outside of the bounds of the pixel value variation caused by the change in the intensity gain in the projected image of the remote site (i.e., $P(m, n)=0$), the evaluated pixel is definitely affected by motion. In step 780, the control unit 320 processes pixels for the reconstructed image of the local site. If $P(m, n)=0$, the control unit 320 does not reduce crosstalk of the specific pixels that are affected by motion but directly adds the pixels to the reconstructed image.

Alternatively, when the pixel value variation $\Delta I$ is within the bounds of the pixel value variation caused by the change in the intensity gain in the projected first image of the remote site (i.e., $P(m, n)=1$), the evaluated pixel is possibly not affected by motion. Then, in step 780, the control unit 320 processes pixels for the reconstructed image of the local site. In particular, the crosstalk reduction analysis from equation (2) is applied to the particular pixels that are not affected by motion. Then, the control unit 320 uses the reconstructed pixels to create reconstructed image of the local site.

The above examples of display-camera system 200 advantageously reduce crosstalk in video streams. Further, the described examples create a brighter display with less flicker and capture more of the camera signal as compared to existing methods for reducing crosstalk.

What is claimed is:

1. A method for reducing video crosstalk in a display-camera system, the method comprising:
   capturing a first image of a local site through a display while projecting an image of a remote site with a first intensity gain;
   capturing a second image of the local site through the display while projecting the image of the remote site with a second intensity gain that is different from the first intensity gain;
   capturing a first mixed image of the local site that includes the first image of the local site combined with the projected image having first intensity gain and a second mixed image of the local site that includes the second image of the local site combined with the projected image having second intensity gain; and
   performing crosstalk reduction on the mixed images, with a computing device, to create a reconstructed image of the local site,
   wherein performing crosstalk reduction of the mixed images includes determining whether a pixel value variation between the mixed images is affected by motion in the first and the second image of the local site.

2. The method of claim 1, wherein the pixel value variation is a difference in pixel intensity values between pixels of the first mixed image and pixels of the second mixed image that have the same coordinates.

3. The method of claim 1, wherein determining whether the pixel value variation between the mixed images is affected by motion in the first and the second image of the local site further includes evaluating each pixel of the mixed images by applying a binary valued classification mask analysis.

4. The method of claim 3, wherein applying the binary valued classification mask analysis includes determining bounds of the pixel value variation caused by a change in the intensity gain in the projected image of the remote site.

5. The method of claim 4, wherein determining bounds of the pixel value variation caused by the change of the intensity gain of the first image of the remote site includes evaluating a maximum intensity gain value determined by specifications of the system.

6. The method of claim 5, wherein applying the binary valued classification mask analysis further includes comparing the pixel value variation between the mixed images with the maximum intensity gain value.

7. The method of claim 6, wherein applying the binary valued classification mask analysis further includes determining that the pixel value variation between the mixed images is affected by motion in the first and the second image of the local site, when the pixel value variation is outside of the bounds of the pixel value variation caused by the change in the intensity gain in the projected image of the remote site.

8. The method of claim 7, further comprising adding pixels of the mixed images that are affected by motion to the reconstructed image without performing crosstalk reduction.

9. The method of claim 6, wherein applying the binary valued classification mask analysis further includes determining that the pixel value variation between the mixed images is possibly not affected by motion in the first and the second image of the local site, when the pixel value variation is within the bounds of the pixel value variation caused by the change in the intensity gain in the projected image of the remote site.

10. The method of claim 9, further comprising performing crosstalk reduction to pixels of the mixed images not affected by motion.

11. A system comprising:
a display;
a camera;
a computing device connected to the display and to the camera, the computing device having a control unit to
cause the camera to capture a plurality of images of a local site through the display,
cause the display to project a plurality of images of a remote site on the display, where each image is projected at least two successive times and where each successive image has a different intensity,
cause the camera to capture a plurality of consecutive crosstalk images of the local site, where each crosstalk image includes an image of the local site combined with an image of the remote cite,
determine whether a pixel value variation between two or more consecutive crosstalk images is affected by motion in the images of the local site included in the two or more consecutive crosstalk images, and
perform crosstalk reduction on the two or more consecutive crosstalk images to produce a reconstructed image of the local user.

12. The system of claim 11, wherein the image of the local site in each crosstalk image is captured at approximately the same time as the image of the remote site included in the crosstalk image is projected.

13. The system of claim 11, wherein a first successive projected image has a full intensity and a second successive projected image has intensity that is not full intensity but is more than zero.

14. The system of claim 11, wherein the control unit is to apply a binary valued classification mask analysis to evaluate all pixels in the two or more crosstalk images.

15. The system of claim 14, wherein the control unit is to apply the binary valued classification mask analysis to compare the pixel value variation between the two or more consecutive crosstalk images with a maximum intensity value determined by specifications of the system, where the maximum intensity value defines limits of the pixel value variation caused by a modulation in the intensity of the projected images of the remote site.

16. The system of claim 15, wherein the control unit is to determine that the pixel value variation between the two or more consecutive crosstalk images is affected by motion when the pixel value variation is outside of the limits of the pixel value variation caused by a modulation in the intensity of the projected images of the remote site, and that the pixel value variation between the two or more consecutive crosstalk images is not affected by motion when the pixel value variation is within the limits of the pixel value variation caused by a modulation in the intensity of the projected images of the remote site.

17. A non-transitory machine-readable storage medium encoded with instructions executable by a processor of a display-camera system, the machine-readable storage medium comprising:
instructions to capture two or more mixed images of a local site, where a first mixed image includes a first image of the local site captured through a display blended with an image of a remote site projected on the display having a first intensity gain, and a second mixed image includes a second image of the local site captured through the display blended with the image projected on the display having a modulated intensity gain;
instructions to determine whether a pixel value difference between the first and the second mixed images is affected by motion in the first and the second image of the local site; and
instructions to select pixels from the mixed images that are not affected by motion and to perform crosstalk reduction to the selected pixels to create a reconstructed image of the local site.

18. The non-transitory machine-readable storage medium of claim 17, further comprising instructions to apply a binary valued classification mask analysis to determine whether a pixel value difference between the first and the second mixed images is affected by motion in the first and the second image of the local site.

19. The non-transitory machine-readable storage medium of claim 17, further comprising instructions to compare the pixel value variation between the two or more consecutive mixed images with a maximum intensity value determined by specifications of the system, where the maximum intensity value defines limits of the pixel value variation caused by a modulation in the intensity gain of the projected image of the remote site.

20. The non-transitory machine-readable storage medium of claim 17, further comprising instructions to combine pixels from the mixed images that are affected by motion, without performing crosstalk reduction, with reconstructed pixels to create the reconstructed image.

* * * * *